(12) United States Patent
Acosta

(10) Patent No.: US 10,210,509 B2
(45) Date of Patent: Feb. 19, 2019

(54) METHOD AND SYSTEM FOR HYBRID TRANSPORTATION-ENABLED PAYMENT CARD

(71) Applicant: MasterCard International Incorporated, Purchase, NY (US)

(72) Inventor: Marina Acosta, Bogota (CO)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 903 days.

(21) Appl. No.: 14/554,540

(22) Filed: Nov. 26, 2014

(65) Prior Publication Data

US 2016/0148195 A1     May 26, 2016

(51) Int. Cl.
*G06Q 40/00* (2012.01)
*G06Q 20/34* (2012.01)
(Continued)

(52) U.S. Cl.
CPC ......... *G06Q 20/3572* (2013.01); *G06Q 20/24* (2013.01); *G06Q 20/28* (2013.01);
(Continued)

(58) Field of Classification Search
CPC ......... G06Q 20/24; G06Q 20/28; G06Q 20/34
(Continued)

(56) References Cited

U.S. PATENT DOCUMENTS

| 8,392,331 B2* | 3/2013 | Ross | G06Q 20/10 |
| | | | 705/35 |
| 8,751,376 B1* | 6/2014 | Wilkes | G06Q 40/02 |
| | | | 705/35 |

(Continued)

FOREIGN PATENT DOCUMENTS

| EP | 3 026 619 A1 | 6/2016 |
| KR | 2002-0021488 A | 3/2002 |

(Continued)

OTHER PUBLICATIONS

Merchant Acquirers and Payment Card Processors: A Look inside the Black Box Author: DeGennaro, Ramon P Publication info: Economic Review—Federal Reserve Bank of Atlanta 91.1: 27-11. Federal Reserve Bank of Atlanta. (First Quarter 2006) (Year: 2006).*

(Continued)

*Primary Examiner* — Bruce I Ebersman
*Assistant Examiner* — John A Anderson
(74) *Attorney, Agent, or Firm* — Buchanan Ingersoll & Rooney PC

(57) ABSTRACT

A method for processing a payment transaction using a hybrid payment card includes: storing an account profile, the profile including data related to a hybrid payment card including a prepaid balance and a credit allowance; receiving a validation request, the request including a transaction amount; processing the received validation request, the processing including: generating a positive validation response and a validation transaction that indicates payment is made using the prepaid balance if the prepaid balance is greater than the transaction amount, generating a positive validation response and a validation transaction that indicates payment is made using the credit allowance if the prepaid balance is less than the transaction amount and if the credit allowance is greater than the transaction amount, and generating a negative validation response if the prepaid balance and credit allowance are less than the transaction amount; and transmitting the generated validation response.

18 Claims, 6 Drawing Sheets

(51) Int. Cl.
  *G06Q 20/28* (2012.01)
  *G06Q 20/40* (2012.01)
  *G06Q 20/24* (2012.01)
  *G06Q 20/38* (2012.01)

(52) U.S. Cl.
  CPC ......... *G06Q 20/34* (2013.01); *G06Q 20/3433* (2013.01); *G06Q 20/382* (2013.01); *G06Q 20/40* (2013.01); *G06Q 20/405* (2013.01)

(58) Field of Classification Search
  USPC .......................................................... 705/44
  See application file for complete search history.

(56) References Cited

U.S. PATENT DOCUMENTS

| | | | |
|---|---|---|---|
| 2007/0136194 A1* | 6/2007 | Sloan | G06Q 20/04 705/41 |
| 2010/0057580 A1 | 3/2010 | Raghunathan | |
| 2011/0276420 A1 | 11/2011 | White et al. | |
| 2013/0173357 A1* | 7/2013 | Lishak | G06Q 10/00 705/13 |
| 2016/0012465 A1* | 1/2016 | Sharp | G06Q 20/18 705/14.17 |

FOREIGN PATENT DOCUMENTS

| | | | | |
|---|---|---|---|---|
| KR | 10-2007-0072807 A | | 7/2007 | |
| KR | 20080110722 A | * | 12/2008 | |
| KR | 10-2009-0129385 A | | 12/2009 | |
| KR | 101030896 B1 | * | 4/2011 | |
| WO | WO-2007070712 A2 | * | 6/2007 | ............. G06Q 20/04 |

OTHER PUBLICATIONS

Notification of Transmittal of the International Search Report and the Written Opinion of the International Searching Authority (Forms PCT/ISA/220, PCT/ISA/210, and PCT/ISA/237) dated Feb. 12, 2016, by the Korean Intellectual Property Office in corresponding International Patent Application No. PCT/US2015/057309. (13 pages).
European Search Report issued by the European Patent Office dated Mar. 24, 2017 in corresponding EP Application No. 15196495.4 (7 pages).
First Examination Report issued by the Saudi Patent Office dated Apr. 9, 2017 in corresponding Saudi Arabian Application No. 115370095 with English language translation (11 pages).
Davivienda—Product Description, 4 pages, with 3 pages machine English translation attached, downloaded Nov. 25, 2014 from http://www.elespectador.com/noticias/bogota/pasajes-de-transmilenio-se-podran-pagar-tarjeta-debitoarticulo-229441.
The Extended European Search Report under Rule 62 EPC issued in European Patent Office dated Apr. 7, 2016 in corresponding EP Application No. 15196495.4 (8 pages).
Office Action dated Aug. 17, 2017, by the Chilean Patent Office in corresponding Chilean Patent Application No. 2015-03457, with a partial English translation of the Office Action. (10 pages).

* cited by examiner

METHOD AND SYSTEM FOR HYBRID TRANSPORTATION-ENABLED PAYMENT CARD

FIELD

The present disclosure relates to the processing of transactions using a hybrid payment card, specifically the use of a hybrid payment card on one of a plurality of payment networks where the card can be used for both prepaid and post-payment transactions.

BACKGROUND

Traditional payment cards are often usable on a single payment network, such as a credit card payment network. In more recent times, some payment cards have been issued that can operate on multiple payment networks in instances where a single entity operates both payment networks. Because the payment networks are operated by a single entity and often utilize the same hardware and systems, the processing of transactions across both networks can be more easily enabled and managed.

However, the types of payment networks that currently exist can be very vast. For instance, some payment networks may be large, international payment networks with hundreds of thousands of member merchants where a consumer can use a single payment card, while other networks may be small, customized networks for as little as a single merchant providing specialized, unique services to their consumers. One such type of specialized payment network is a transportation network. Such a type of transportation network is a closed payment network that enables a consumer to use a single, prepaid payment card at any point of sale in the system in order to pay a fare. By using a unified network across all points of sale in the system, convenience for consumers is greatly increased, which can increase participation and therefore overall revenue.

However, such a closed payment network that uses only prepaid payment cards can lack a number of benefits that consumers may enjoy that are provided by other payment networks. For instance, if a consumer is unaware of their balance and does not have sufficient funds to pay for a transaction, the consumer may be unable to proceed. In instances where time may be important, such as the catching of a bus or a train in a transportation network, it may result in the consumer being unable to complete the transaction, resulting in a decrease in both revenue and consumer satisfaction. Furthermore, by requiring the consumer to constantly reload their prepaid card, added time is lost for the consumer whenever they need to reload their card, which may sometimes require them to visit locations separate from their departure or destination point. Similarly, the payment network being separate from other payment networks also necessitates consumers carrying multiple payment cards. This may be inconvenient to some consumers, resulting in decreased participation, and can also be inefficient, resulting in lost or misplaced payment cards, which can further decrease participation and revenue.

Thus, there is a need for a technical system that enables a payment network to provide both prepaid transactions as well as a type of post-payment transactions for increased consumer convenience, and also to provide the ability for a payment card to be used on an additional payment network to further increase use and participation. The use of a hybrid payment card on multiple payment networks, and one that is enabled for use for both prepaid and post-payment transactions, may result in increased adoption and use, thereby increasing consumer participation and revenue for both payment networks and their associated merchants.

SUMMARY

The present disclosure provides a description of systems and methods for processing payment transactions using a hybrid payment card.

A method for processing a payment transaction using a hybrid payment card includes: storing, in an account database, an account profile, wherein the account profile includes data related to a hybrid payment card configured for use in at least two payment networks, the account profile including at least an account identifier, a prepaid balance, and a credit allowance; receiving, by a receiving device, a validation request, wherein the validation request includes at least the account identifier and a transaction amount; processing, by a processing device, the received validation request, wherein processing the received validation request includes one of: generating a positive validation response and generating a validation transaction that indicates payment is to be made using the prepaid balance if the prepaid balance included in the account profile is greater than or equal to the transaction amount, generating a positive validation response and generating a validation transaction that indicates payment is to be made using the credit allowance if the prepaid balance included in the account profile is less than the transaction amount and if the credit allowance included in the account profile is greater than or equal to the transaction amount, and generating a negative validation response if the prepaid balance and the credit allowance included in the account profile are less than the transaction amount; and transmitting, by a transmitting device, the generated validation response in response to the received validation request.

A system for processing a payment transaction using a hybrid payment card includes an account database, a receiving device, a processing device, and a transmitting device. The account database is configured to store an account profile, wherein the account profile includes data related to a hybrid payment card configured for use in at least two payment networks, the account profile including at least an account identifier, a prepaid balance, and a credit allowance. The receiving device is configured to receive a validation request, wherein the validation request includes at least the account identifier and a transaction amount. The processing device is configured to process the received validation request, wherein processing the received validation request includes one of: generating a positive validation response and generating a validation transaction that indicates payment is to be made using the prepaid balance if the prepaid balance included in the account profile is greater than or equal to the transaction amount; generating a positive validation response and generating a validation transaction that indicates payment is to be made using the credit allowance if the prepaid balance included in the account profile is less than the transaction amount and if the credit allowance included in the account profile is greater than or equal to the transaction amount; and generating a negative validation response if the prepaid balance and the credit allowance included in the account profile are less than the transaction amount. The transmitting device is configured to transmit the generated validation response in response to the received validation request.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Payment Network—A system or network used for the transfer of money via the use of cash-substitutes. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, transaction accounts, etc. Payment networks may be open (e.g., "open-loop") networks as well as closed (e.g., "closed-loop") networks, and may serve any number of merchants from a single merchant to any vast number of merchants. Examples of networks or systems configured to perform as payment networks include those operated by MasterCard®, VISA®, Discover®, American Express®, PayPal®, etc. Use of the term "payment network" herein may refer to both the payment network as an entity, and the physical payment network, such as the equipment, hardware, and software comprising the payment network.

Transaction Account—A financial account that may be used to fund a transaction, such as a checking account, savings account, credit account, virtual payment account, etc. A transaction account may be associated with a consumer, which may be any suitable type of entity associated with a payment account, which may include a person, family, company, corporation, governmental entity, etc. In some instances, a transaction account may be virtual, such as those accounts operated by PayPal®, etc.

Payment Card—A card or data associated with a transaction account that may be provided to a merchant in order to fund a financial transaction via the associated transaction account. Payment cards may include credit cards, debit cards, charge cards, stored-value cards, prepaid cards, fleet cards, virtual payment numbers, virtual card numbers, controlled payment numbers, etc. A payment card may be a physical card that may be provided to a merchant, or may be data representing the associated transaction account (e.g., as stored in a communication device, such as a smart phone or computer). For example, in some instances, data including a payment account number may be considered a payment card for the processing of a transaction funded by the associated transaction account. In some instances, a check may be considered a payment card where applicable.

System for Processing Payment Transactions Using a Hybrid Payment Card

Figure 1:
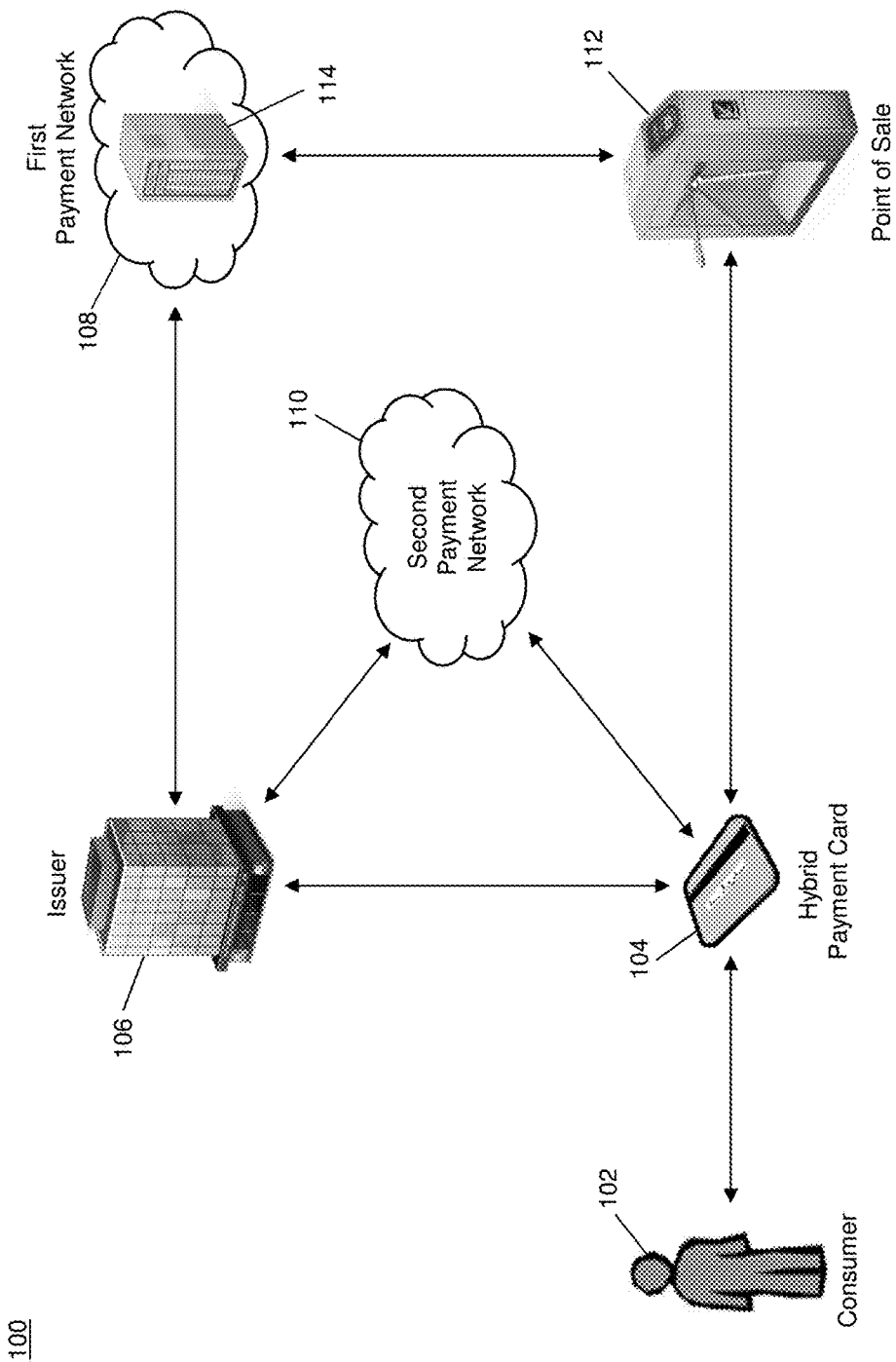
FIG. 1 is a block diagram illustrating a high level system architecture for processing prepaid and post-payment transactions using a hybrid payment card in accordance with exemplary embodiments.

FIG. 1 illustrates a system 100 for the processing of prepaid and post-payment transactions using a hybrid payment card usable on two or more payment networks.

In the system 100, a consumer 102 may possess a hybrid payment card 104. The hybrid payment card 104 may be a payment card associated with one or more transaction accounts, issued to the consumer 102 by an issuer 106. The issuer 106 may be a financial institution or other suitable entity that holds a transaction account associated with the consumer 102 that is configured to issue payment cards, such as the hybrid payment card 104, to consumers. The hybrid payment card 104 may be usable at a plurality of payment networks, such as a first payment network 108 and a second payment network 110.

The first payment network 108 may be configured to process both prepaid and post-payment transactions, discussed in more detail below. The hybrid payment card 104 may be associated with an account having both a prepaid balance and a credit allowance. The hybrid payment card 104 may be used at a point of sale 112 associated with the first payment network 108. When used at the point of sale 112, a payment transaction may be initiated for a transaction amount. A processing server 114 of the first payment network 108, discussed in more detail below, may be configured to identify if the prepaid balance for the hybrid payment card 104 is sufficient for processing the payment transaction. If the prepaid balance is sufficient, the payment transaction may be conducted using that prepaid balance. If the prepaid balance is insufficient (e.g., the transaction amount is greater than the prepaid balance), then the credit allowance may be used.

The credit allowance may be a line of credit usable by the consumer 102 to pay for a payment transaction, a balance on which may be automatically paid at a predetermined interval. For instance, the hybrid payment card 104 may have a daily credit allowance on which an outstanding balance is paid at the end of every day, and the credit allowance reset. The amount of the credit allowance and the predetermined interval may be set by the issuer 106, the first payment network 108, the consumer 102, or other suitable entity. In instances where the prepaid balance of the hybrid payment card 104 is insufficient, the payment transaction may be processed using an available portion of the credit allowance, if the credit allowance is sufficient to cover (e.g., is greater than or equal to) the transaction amount. If the credit allowance is insufficient, the payment transaction may be denied.

In some embodiments, the processing server 114 may process the payment transaction immediately, such as by updating the prepaid balance and/or credit allowance for the hybrid payment card 104. In some instances, the account information may be stored in the processing server 114. In other instances, the account information may be stored in a memory of the hybrid payment card 104. In yet another instance, the account information may be stored at the issuer 106, and received by the processing server 114 during processing of the payment transaction. In some embodiments, the processing server 114 may be part of the point of sale 112. In such an embodiment, the transaction may be processed directly at the point of sale 112.

In some instances, the processing server 114 may generate validation transactions as a result of transaction processing. Validation transactions may include indication of payments made by the consumer 102 using the hybrid payment card 104, and may be provided to the issuer 106 at a predetermined period of time, such as at the predetermined interval used to reset the credit allowance of the hybrid payment card 104. The issuer 106 may receive the validation transactions, which may include relevant transaction data, such as transaction times and/or dates, transaction amounts, etc., and process the transaction account accordingly. For instance, the issuer 106 may charge the consumer 102 for the balance spent on the credit allowance, such as by debiting the transaction account, charging a credit transaction for the balance on the transaction account, or other suitable method.

The hybrid payment card 104 may also be used on the second payment network 110. The second payment network 110 may be a credit network, a debit network, or any other suitable type of payment network as will be apparent to persons having skill in the relevant art. In some embodiments, the second payment network 110 may be another payment network configured to process prepaid and post-payment transactions, such as the first payment network 108.

In some embodiments, if the hybrid payment card 104 lacks a sufficient prepaid balance and credit allowance, the processing server 114 may attempt to process the payment transaction at the point of sale 112 using the hybrid payment card 104 as a traditional credit card. In some instances, the payment transaction may be processed as a credit transaction using the second payment network 110. In such an instance, the second payment network 110 may process the credit transaction using traditional methods and systems that will be apparent to persons having skill in the relevant art, and provide an authorization response to the processing server 114, which may then proceed accordingly. For example, if the payment transaction is in a transportation network for gaining access to a train or bus, the consumer 102 may be allowed to enter the train or bus if the second payment network 110 provides an authorization response indicating approval of the payment transaction.

In some embodiments, the hybrid payment card 104 may include a single integrated circuit chip or other type of payment card authentication method usable by both the first payment network 108 and the second payment network 110. In an exemplary embodiment, the hybrid payment card 104 may use a single chip configured to perform contactless payment transactions (e.g., using near field communication, radio frequency, etc.) on both the first payment network 108 and the second payment network 110. For example, an integrated circuit chip may be included in the hybrid payment card 104 that includes rulesets and standards for the generation of cryptograms and transaction messages suitable for conducting payment transactions on either and both payment networks using the single chip. In such an instance, the hybrid payment card 104 may be configured for use on both payment networks without requiring the hybrid payment card 104 to include multiple chips or authentication methods.

By enabling the hybrid payment card 104 to be used across multiple payment networks, convenience for consumers 102 may be increased, which may in-turn result in increased participation by consumers 102 and therefore revenue for merchants, issuers 106, and the payment networks. In addition, by processing both prepaid and post-payment transactions, the processing server 114 may enable the consumer 102 to have greater use of their hybrid payment card 104, particularly in closed payment networks where prepaid transactions alone may be too restrictive. This can also be of great benefit to consumers 102 by enabling consumers to regularly use the payment network without the need to regularly reload the hybrid payment card 104, decreasing lost time and increasing consumer convenience. When this functionality is combined with the ability to use the hybrid payment card 104 on an additional payment network, such as a credit network, the functionality offered to the consumer 102 can be increased even more, providing additional benefits and revenue to all entities involved. Such benefits are unavailable in traditional payment networks and among traditional payment cards usable in multiple payment networks.

Processing Server

Figure 2:
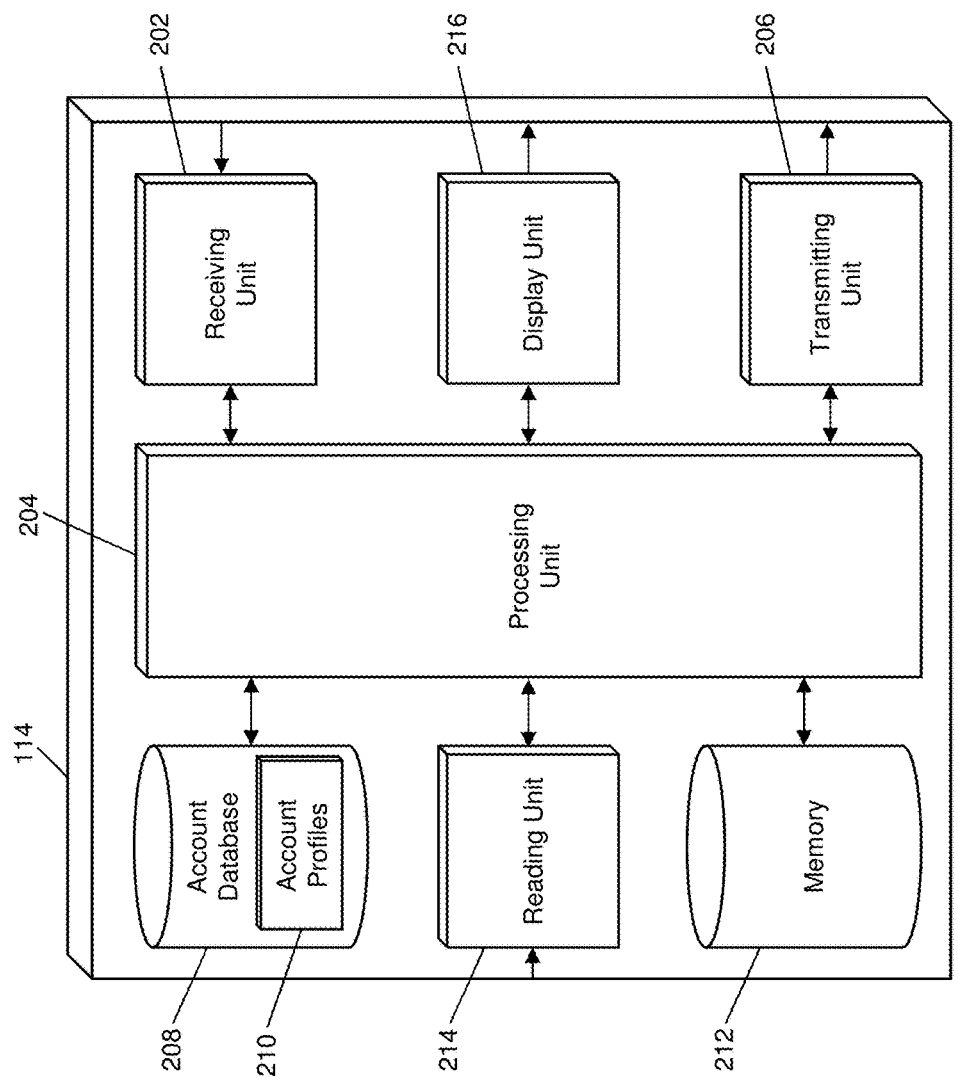
FIG. 2 is a block diagram illustrating the processing server 102 of FIG. 1 for the processing of prepaid and post-payment transactions in accordance with exemplary embodiments.

FIG. 2 illustrates an embodiment of the processing server 114 of the system 100. It will be apparent to persons having skill in the relevant art that the embodiment of the processing server 114 illustrated in FIG. 2 is provided as illustration only and may not be exhaustive to all possible configurations of the processing server 102 suitable for performing the functions as discussed herein. For example, the computer system 600 illustrated in FIG. 6 and discussed in more detail below may be a suitable configuration of the processing server 102.

The processing server 114 may include a receiving unit 202. The receiving unit 202 may be configured to receive data over one or more networks via one or more network protocols. The receiving unit 202 may receive account information from the issuer 106, the point of sale 112, or any other suitable entity. The account information may include data associated with one or more transaction accounts associated with a hybrid payment card 104, as discussed in more detail below.

The processing server 114 may also include an account database 208. The account database 208, as discussed in more detail below, may include a plurality of account profiles 210. Each account profile 210 may include data related to a hybrid payment card 104 that is configured to be used in multiple payment networks, such as the first payment network 108 and the second payment network 110. The account profile 210 may include at least a prepaid balance and a credit allowance.

The receiving unit 202 may receive data for a payment transaction, which may include data identifying the hybrid payment card 104 used to fund the payment transaction, such as an account identifier, discussed in more detail below. In some instances, the receiving unit 202 may receive credit allowance and prepaid balance data, such as directly from the hybrid payment card 104, from the point of sale 112, or from the issuer 106 (e.g., subsequent to a request for data submitted to the issuer 106 upon initiation of the payment transaction). The processing server 114 may include a processing unit 204. The processing unit 204 may be configured to perform the functions of the processing server 114 discussed herein, as will be apparent to persons having skill in the relevant art, including the identification of an account profile 210 corresponding to the hybrid payment card 104 used in the payment transaction.

In some embodiments, the processing server 114 may include a reading unit 214. The reading unit 214 may be configured to read data directly from the hybrid payment card 104 using methods and systems that will be apparent to persons having skill in the relevant art, such as via a magnetic strip, integrated circuit chip, near field communication, etc. In such an embodiment, the reading unit 214 may read the identifying information and/or the prepaid balance and credit allowance directly from the hybrid payment card 104. In some instances, the reading unit 214 may be included in the processing server 114 if the processing server 114 is part of the point of sale 112.

Once the account profile 210 has been identified and/or the account data read or received, the processing unit 204 may process the payment transaction. Processing of the payment transaction may include generating a positive or negative validation response based on the transaction amount for the payment transaction and the prepaid balance and/or credit allowance for the hybrid payment card 104. In one embodiment, the processing unit 204 may first attempt to process the payment transaction using the prepaid balance, and then attempt the payment transaction using the credit allowance. In some instances, the payment transaction may be processed using both the prepaid balance and the credit allowance, if the prepaid balance is insufficient to cover the full amount of the transaction amount.

The processing server 114 may include a transmitting unit 206. The transmitting unit 206 may be configured to transmit data over one or more networks via one or more network protocols. The transmitting unit 206 may transmit the generated validation response to the point of sale 112, which may then proceed to perform one or more functions based on the response. For instance, if the point of sale 112 is a turnstile that provides access to a bus or train, the turnstile may allow the consumer 102 to pass if the validation response is positive. In embodiments where the processing server 114 is a part of the point of sale 112, the validation response may be transmitted to a component of the point of sale 112 operating the turnstile, which may, in some instances, by the processing unit 204 itself.

In some embodiments, the processing server 114 may include a display unit 216. The display unit 216 may be configured to display data using one or more display devices, such as a liquid crystal display, light-emitting diode display, thin film transistor display, capacitive touch screen display, or any other suitable type of display device. The display unit 216 may display, for instance, data associated with the processed transaction, such as the validation response, the prepaid balance, the credit allowance, etc.

The processing unit 204 may also be configured to generate a validation transaction. The validation transaction may include an indication of the payment method used to fund an approved payment transaction, such as the prepaid balance or credit allowance. The validation transaction may also include a transaction amount, remaining balance, remaining allowance, transaction time and/or date, location identifier, or any other suitable data that will be apparent to persons having skill in the relevant art. The transmitting unit 206 may transmit the validation transaction to the issuer 106 associated with the hybrid payment card 104, such as for settlement of an associated transaction account (e.g., payment of a balance on the credit allowance). In some instances, the transmitting unit 206 may transmit the validation transaction at a predetermined interval, such as daily.

In some embodiments, the processing unit 204 may be configured to reset the credit allowance for one or more account profiles 210. For example, the credit allowance may be reset at a predetermined interval, such as the predetermined interval at which validation transactions are transmitted to the associated issuers 106. In such an embodiment, the processing unit 204 may reset the credit allowance in each account profile 210 to a predetermined value, which may be different for each account profile 210. In instances where the account profile 210 may be stored on the associated hybrid payment card 104, the transmitting unit 206 may transmit an instruction to the hybrid payment card 104 to reset the credit allowance during the first transaction following the predetermined interval that initiates reset of the allowance. In such an instance, the hybrid payment card 104 and/or processing server 114 may store data used to identify if the payment transaction is the first transaction following such a time.

In embodiments where the processing server 114 may be configured to process payment transactions as credit transactions when both the prepaid balance and credit allowance are insufficient, the components of the processing server 114 may be further configured to perform additional functions necessary thereto as will be apparent to persons having skill in the relevant art. In instances where credit transactions may be processed by a separate payment network, such as the second payment network 110, the transmitting unit 206 may be configured to transmit an authorization request for the payment transaction to the second payment network 110 including an account identifier and transaction data (e.g., the transaction amount). The receiving unit 202 may receive an authorization response from the second payment network 110 indicating approval or denial of the payment transaction, and the processing unit 204 may proceed accordingly, such as by generated a positive or negative validation response based thereon.

In some embodiments, the processing server 114 may also include a memory 212. The memory 212 may be configured to store data suitable for performing the functions of the processing server 114. The memory 212 may include, for example, transaction processing rules, data used for communication with the point of sale 112, hybrid payment card 104, issuer 106, or other entity, transaction amounts, credit allowance resetting rules and amounts, validation transaction generation and transmission rules, etc. Additional data that may be stored in the memory 212 will be apparent to persons having skill in the relevant art.

Account Database

Figure 3:
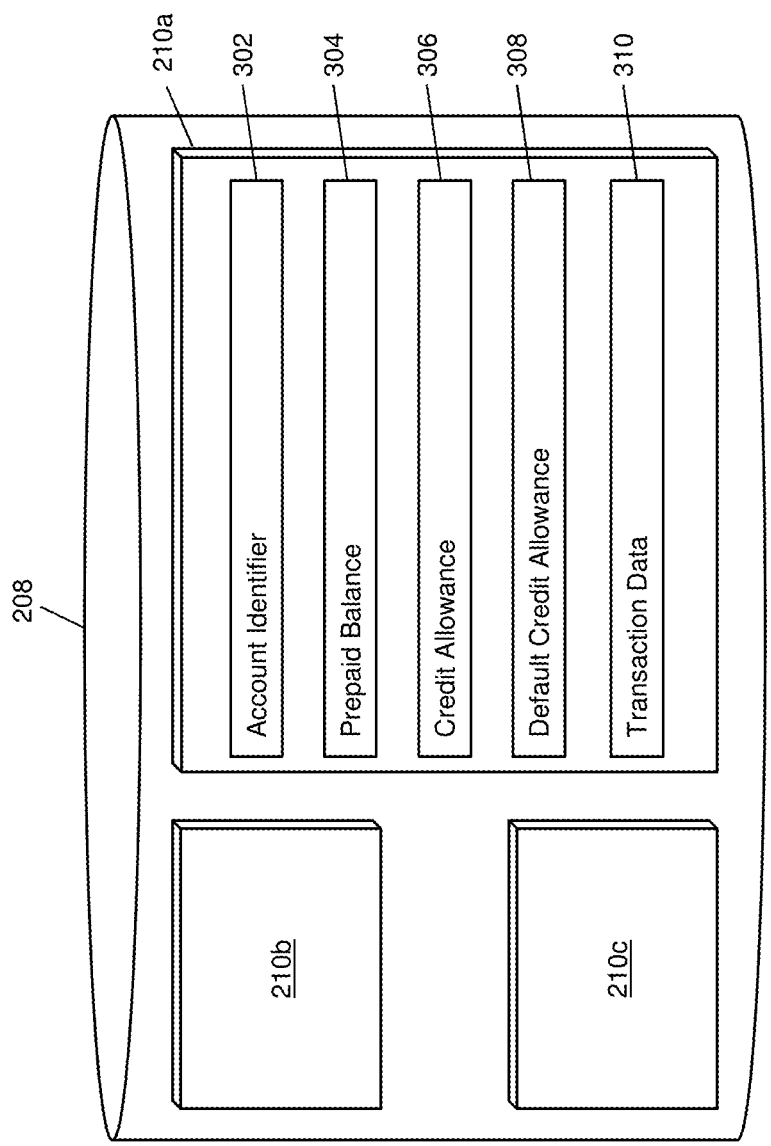
FIG. 3 is a block diagram illustrating the account database of the processing server of FIG. 2 for storing account profiles in accordance with exemplary embodiments.

FIG. 3 illustrates an exemplary embodiment of the account database 208 of the processing server 114 for storing data associated with hybrid payment cards 104.

As discussed above, the account database 208 may include a plurality of account profiles 210, illustrated in FIG. 3 as account profiles 210a, 210b, and 210c. Each account profile 210 may include at least an account identifier 302, prepaid balance 304, and credit allowance 306. The account identifier 302 may be a unique value associated with the account profile 210 or related hybrid payment card 104. The account identifier 302 may be, for example, a transaction account number, reference number, serial number, device identifier, telephone number, username, or any other suitable value that will be apparent to persons having skill in the relevant art.

The prepaid balance 304 may be a prepaid amount that is used to fund payment transactions using the associated hybrid payment card 104. The prepaid balance may be funded using traditional methods and systems, such as by transferring funds to the issuer 106 of the associated transaction account using a variety of payment methods and payment sources. In some embodiments, the prepaid balance 304 may be required to cover the entire transaction amount for a payment transaction to be used. In other instances, a prepaid balance 304 may still be used even if the balance is insufficient to cover a transaction amount, with the remainder of the transaction amount being paid using other sources, such as the credit allowance 306.

The credit allowance 306 may be a credit amount suitable for use in funding payment transactions using the hybrid payment card 104 that is reset at a predetermined interval and is charged to the associated transaction account and/or consumer 102 at the predetermined interval following use for payment in one or more payment transactions, referred to herein as post-payment transactions. The credit allowance 306 may refer to the remaining allowance that can be used during the predetermined interval, and may be used to fund a payment transaction in the same manner as the prepaid balance 304, such as the amount being deducted when a payment transaction is funded.

When the predetermined interval has passed, the credit allowance 306 may be returned to a default amount. In some instances, an account profile 210 may include a default credit allowance 308. The default credit allowance 308 may be the amount to which the credit allowance 306 is reset once the predetermined interval has passed. In some embodiments, each account profile 210 may share a default credit allowance 308, which may be stored in the memory 212 of the processing server 114. The predetermined interval may be any suitable length of time, which may be set by the issuer 106, consumer 102, first payment network 108, or other suitable entity, such as twelve hours, one day, one week, one month, etc.

In some embodiments, the account profile 210 may also include transaction data 310. The transaction data 310 may include data associated with one or more payment transactions conducted involving the associated hybrid payment card 104. The transaction data 310 may include transaction amounts, transaction times and/or dates, geographic locations, and other suitable information that will be apparent to persons having skill in the relevant art.

In some instances, the data included in the account profile 210 may be viewable by a consumer 102 associated with the account profile 210 and/or related hybrid payment card 104. For instance, the consumer 102 may view account information using a suitable computing device (e.g., a desktop computer, laptop computer, cellular phone, smart phone, smart watch, etc.) to access account information using methods and systems that will be apparent to persons having skill in the relevant art, in order to view their prepaid balance 304, credit allowance 306, transaction data 310, etc. In some instances, the point of sale 112 may be used by the consumer 102 to view account data, such as by receiving the account data from the processing server 114 or, in instances where the point of sale 112 is the processing server 114, viewing the information directly on the display unit 216.

Processing Prepaid and Post-Payment Transactions Using a Hybrid Payment Card

Figure 4:
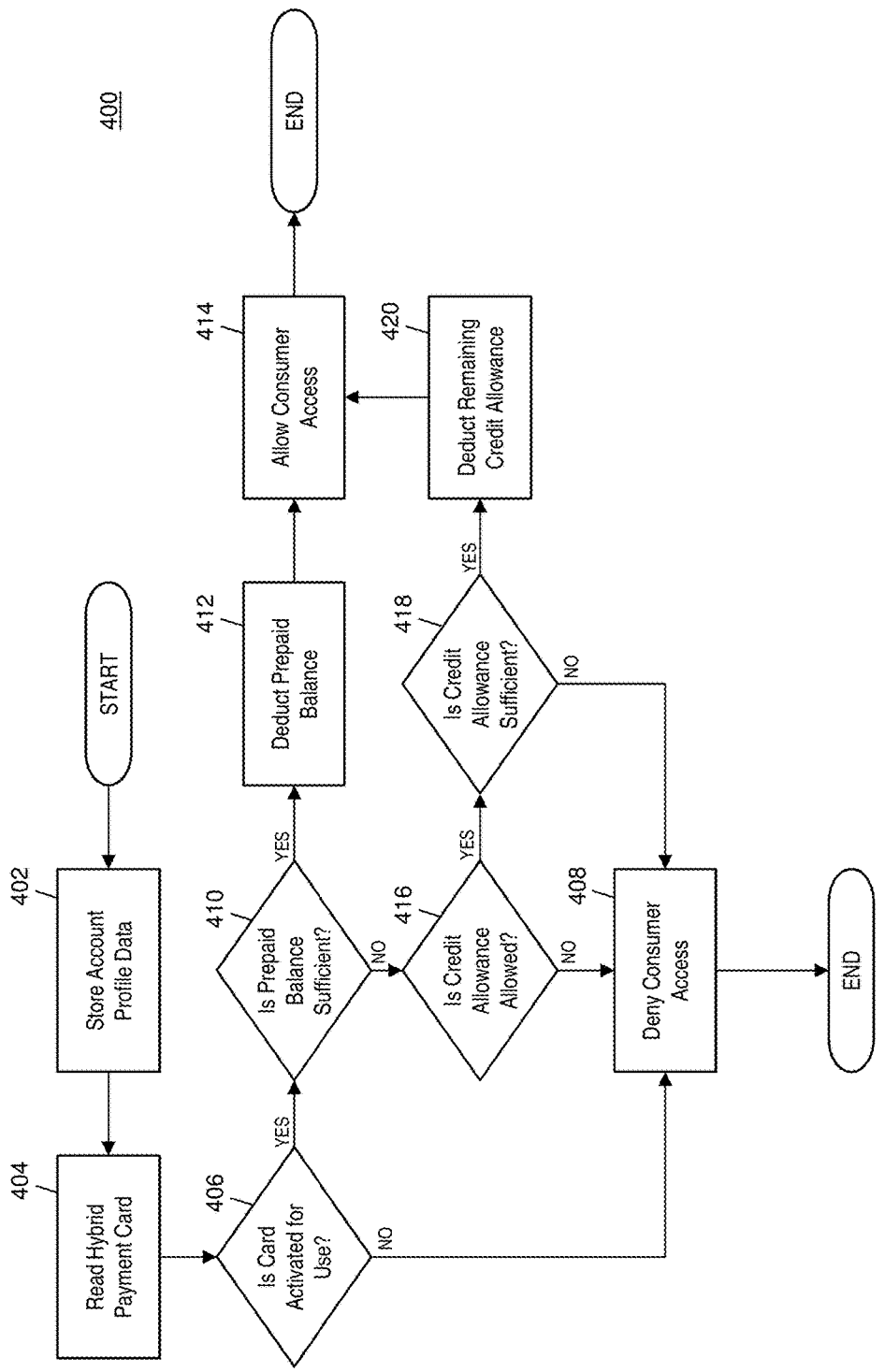
FIG. 4 is a flow diagram illustrating a process for the processing of prepaid and post-payment transactions using a hybrid payment card in a payment network in accordance with exemplary embodiments.

FIG. 4 illustrates an example process 400 for the processing of prepaid and post-payment transactions involving the hybrid payment card 104 using the processing server 114. The process 400, illustrated in FIG. 4, and discussed below, describes an example implementation of the processing server 114 in the system 100, where the payment transaction initiated by the consumer 102 is for access to a transportation system, such as a bus or train in a unified transportation network. Persons having skill in the relevant art will find it apparent that the process 400 is provided as an illustration only, and that the methods and systems discussed herein for processing transactions involving hybrid payment cards 104 using both prepaid and post-payment transactions may be used in a variety of services and industries.

In step 402, the processing unit 204 of the processing server 114 may store account profile data in the account profiles 210 in the account database 208. Each account profile 210 may include at least an account identifier 302, prepaid balance 304, and credit allowance 306. In step 404, the reading unit 214 may read the hybrid payment card 104 to obtain at least the account identifier 302 associated with the hybrid payment card 104. In some instances, the account identifier 302 may be received by the receiving unit 202, such as from the point of sale 112, issuer 106, or hybrid payment card 104.

In step 406, the processing unit 204 may identify an account profile 210 associated with the hybrid payment card 104 using the account identifier 302 and determine if the hybrid payment card 104 is activated for use. For instance, the hybrid payment card 104 may not be confirmed as issued to the consumer 102, may be frozen by the issuer 106, or otherwise blocked or deactivated for any reason that will be apparent to persons having skill in the relevant art. If the hybrid payment card 104 is not active for use, then, in step 408, the consumer 104 may be denied access to the bus or train. The denying of access may be accomplished via the generation of a negative validation response by the processing unit 204 that is transmitted, by the transmitting unit 206, to the point of sale 112, which is interpreted by the point of sale 112 as an instruction to deny access to the bus or train.

If the hybrid payment card 104 is determined, in step 406, to be active, then, in step 410, the processing unit 204 may determine if the prepaid balance 304 in the account profile 210 associated with the hybrid payment card 104 is sufficient to cover the transaction amount for the payment transaction. The transaction amount may be supplied by the point of sale 112 or other suitable entity, or may be identified by the processing unit 204, such as in the memory 212, and such as in an instance where the point of sale 112 includes the processing server 114.

If the prepaid balance 304 is sufficient (e.g., greater than or equal to the transaction amount), then, in step 412, the processing unit 204 may deduct the transaction amount from the prepaid balance 304. In step 414, the consumer 102 may be allowed access to the bus or train, such as via the generation of a positive validation response by the processing unit 204 that is transmitted by the transmitting unit 206, to the point of sale 112. In some instances, step 412 or step 414 may also include the generation of a validation transaction by the processing unit 204, which may be transmitted to the issuer 106 by the transmitting unit 206 (e.g., at the time of the payment transaction or at a predetermined interval) that indicates the conducting of a payment transaction funded using the prepaid balance 304.

If, in step 410, the processing unit 204 determines that the prepaid balance 304 is insufficient to cover the transaction amount, then, in step 418, the processing unit 204 may determine if the hybrid payment card 104 is enabled to use a credit allowance 306. In embodiments where the hybrid payment card 104 may not be enabled to use a credit allowance 306, or in instances where a specific hybrid payment card 104 may not be allowed to use a credit allowance 306 (e.g., based on criteria set by the issuer 106), then the process 400 may proceed to step 408 where the consumer 102 is denied access via the generation of a negative validation response by the processing unit 204.

If the hybrid payment card 104 is able to use a credit allowance 306, then, in step 418, the processing unit 204 may determine if the credit allowance 306 is sufficient to cover the transaction amount for the payment transaction. If the credit allowance 306 is insufficient to pay for the payment transaction, then the process 400 may again proceed to step 408 where the consumer 104 is denied access to the bus or train. In some embodiments, the processing server 114 may attempt to process the payment transaction as a traditional credit or debit transaction across the second payment network 110 using methods and systems that will be apparent to persons having skill in the relevant art following an insufficient result in step 418. In some instances, such a payment transaction may be processed using the same chip or authentication method of the hybrid payment card 104 used to initiate the payment transaction with the first payment network 108.

If the credit allowance 306 in the account profile 210 is determined as being sufficient to cover the payment transaction, then, in step 420, the processing unit 204 may deduct the transaction amount from the credit allowance 306. Then the process may proceed to step 414, where the consumer 102 will be allowed access to the bus or train. In instances where a validation transaction is to be generated and transmitted to the issuer 106 (e.g., for post-payment processing of the credit allowance transactions), the process 400 may include an additional step for the transmitting of one or more validation transactions to the issuer 106 at the predetermined interval.

In some embodiments, the process 400 may be adjusted such that the credit allowance 306 is checked for sufficiency for use in funding the payment transaction first, prior to use of the prepaid balance. In such an embodiments, the actions performed in steps 410 and 418 may be exchanged, with step 416 including a determination if a prepaid balance 304 is available for use with the hybrid payment card 104.

Figure 5:
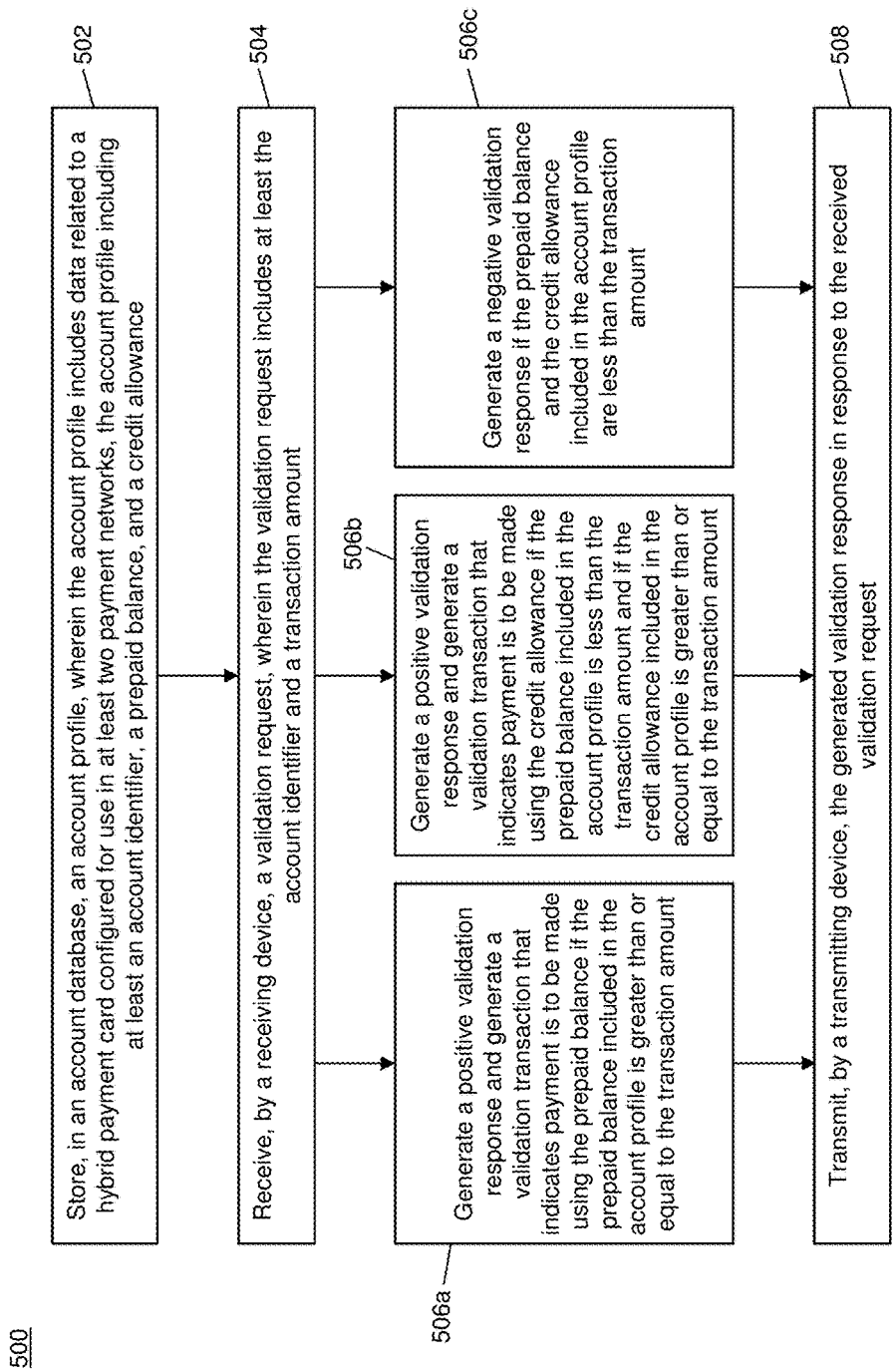
FIG. 5 is a flow chart illustrating an exemplary method for processing a payment transaction using a hybrid payment card in accordance with exemplary embodiments.

Exemplary Method for Processing a Payment Transaction Using a Hybrid Payment Card FIG. 5 illustrates a method 500 for the processing of a payment transaction as a prepaid or post-payment transaction using a hybrid payment card.

In step 502, an account profile (e.g., account profile 210) may be stored in an account database (e.g., the account database 208), wherein the account profile 210 includes data related to a hybrid payment card (e.g., the hybrid payment card 104) configured for use in at least two payment networks, the account profile 210 including at least an account identifier (e.g., the account identifier 302), a prepaid balance (e.g., the prepaid balance 304), and a credit allowance (e.g., the credit allowance 306). In one embodiment, the hybrid payment card 104 may be configured for use in a credit and/or debit payment network and a closed payment network. In a further embodiment, the closed payment network may be a public transportation network. In step 504, a receiving device (e.g., the receiving unit 202) my receive a validation request, wherein the validation request includes at least the account identifier 302 and a transaction amount.

The method 500 may then proceed to one of three possible steps depending on the values included in the prepaid balance 304 and credit allowance 306 included in the account profile 210. In step 506a, a positive validation response and a validation transaction that indicates payment is to be made using the prepaid balance 304 may be generated, by a processing device (e.g., the processing unit 204), if the prepaid balance 304 included in the account profile 210 is greater than or equal to the transaction amount. In step 506b, a positive validation response and a validation transaction that indicates payment is to be made using the credit allowance 306 may be generated by the processing device 204 if the prepaid balance 304 included in the account profile 210 is less than the transaction amount and if the credit allowance 306 included in the account profile 210 is greater than or equal to the transaction amount. In step 506c, a negative validation response may be generated by the processing device 204 if the prepaid balance 304 and the credit allowance 306 included in the account profile 210 are less than the transaction amount.

Once the validation response has been generated, in step 508, the generated validation response may be transmitted by a transmitting device (e.g., the transmitting unit 206) in response to the received validation request. In one embodiment, the credit allowance 306 may be a daily credit amount, and the method 500 may also include resetting, by the processing device 204, the credit allowance 306 included in the account profile 210 to a default amount (e.g., the default credit allowance 308). In some embodiments, the method 500 may further include transmitting, by the transmitting device 206, the generated validation transaction to a payment network.

In one embodiment, the account profile 210 may be stored in a memory of the hybrid payment card 104, and the method 500 may also include reading, by a reading device (e.g., the reading unit 214), at least the prepaid balance 304 and the credit allowance 306 stored in the memory of the hybrid payment card 104. In a further embodiment, the method 500 may even further include transmitting, by the transmitting device 206, the generated validation transaction to the hybrid payment card 104 for use in updating the stored account profile.

In some embodiments, the method 500 may also include: updating, by the processing device 204, the prepaid balance 304 included in the account profile 210 based on the transaction amount if the prepaid balance 304 included in the account profile 210 is greater than or equal to the transaction amount; and updating, by the processing device 204, the credit allowance 306 included in the account profile 210 based on the transaction amount if the prepaid balance 304 included in the account profile 210 is less than the transaction amount and if the credit allowance 306 included in the account profile 210 is greater than or equal to the transaction amount.

In one embodiment, the method 500 may further include: transmitting, by the transmitting device 206, an authorization request for a payment transaction if the prepaid balance 304 and the credit allowance 306 included in the account profile 210 are less than the transaction amount, wherein the authorization request includes at least the account identifier 302 and the transaction amount; and receiving, by the receiving device 202, an authorization response for the payment transaction indicating approval or denial of the payment transaction, wherein processing the received validation request further includes generating a positive validation response and generating a validation transaction that indicates payment was made using the hybrid payment card 104 if the received authorization response indicates approval of the payment transaction, and wherein the negative validation response is generated during processing of the received validation request if the received authorization response indicated denial of the payment transaction. In a further embodiment, the authorization request may be transmitted to a first payment network, and the validation request may be received via a second payment network.

Computer System Architecture

Figure 6:
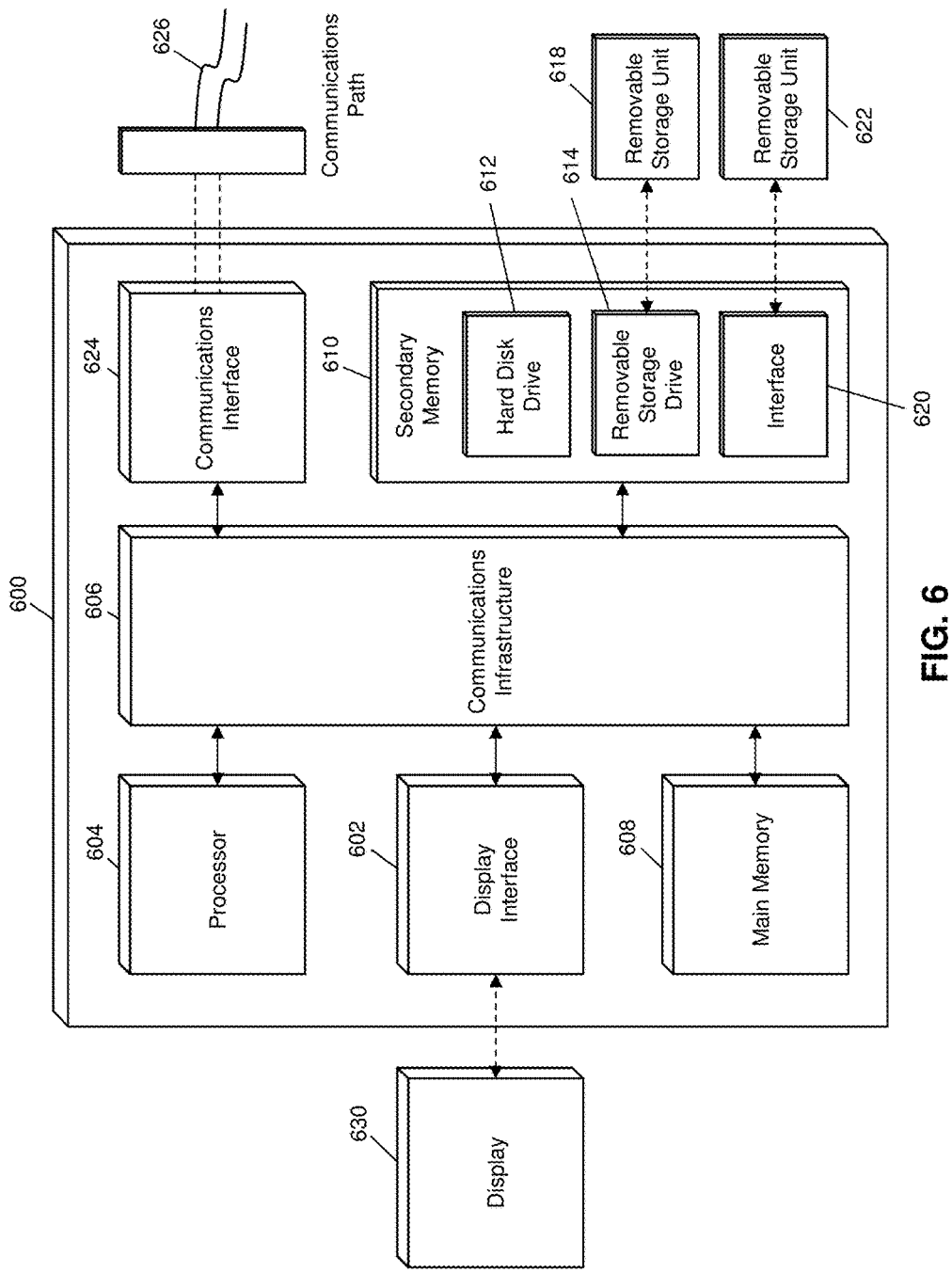
FIG. 6 is a block diagram illustrating a computer system architecture in accordance with exemplary embodiments.

FIG. 6 illustrates a computer system 600 in which embodiments of the present disclosure, or portions thereof, may be implemented as computer-readable code. For example, the processing server 114 of FIG. 1 may be implemented in the computer system 600 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 4 and 5.

If programmable logic is used, such logic may execute on a commercially available processing platform or a special purpose device. A person having ordinary skill in the art may appreciate that embodiments of the disclosed subject matter can be practiced with various computer system configurations, including multi-core multiprocessor systems, mini-computers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 618, a removable storage unit 622, and a hard disk installed in hard disk drive 612.

Various embodiments of the present disclosure are described in terms of this example computer system 600. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 604 may be a special purpose or a general purpose processor device. The processor device 604 may be connected to a communications infrastructure 606, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 600 may also include a main memory 608 (e.g., random access memory, read-only memory, etc.), and may also include a secondary memory 610. The secondary memory 610 may include the hard disk drive 612 and a removable storage drive 614, such as a floppy disk drive, a magnetic tape drive, an optical disk drive, a flash memory, etc.

The removable storage drive 614 may read from and/or write to the removable storage unit 618 in a well-known manner. The removable storage unit 618 may include a removable storage media that may be read by and written to by the removable storage drive 614. For example, if the removable storage drive 614 is a floppy disk drive or universal serial bus port, the removable storage unit 618 may be a floppy disk or portable flash drive, respectively. In one embodiment, the removable storage unit 618 may be non-transitory computer readable recording media.

In some embodiments, the secondary memory 610 may include alternative means for allowing computer programs or other instructions to be loaded into the computer system 600, for example, the removable storage unit 622 and an interface 620. Examples of such means may include a program cartridge and cartridge interface (e.g., as found in video game systems), a removable memory chip (e.g., EEPROM, PROM, etc.) and associated socket, and other removable storage units 622 and interfaces 620 as will be apparent to persons having skill in the relevant art.

Data stored in the computer system 600 (e.g., in the main memory 608 and/or the secondary memory 610) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 600 may also include a communications interface 624. The communications interface 624 may be configured to allow software and data to be transferred between the computer system 600 and external devices. Exemplary communications interfaces 624 may include a modem, a network interface (e.g., an Ethernet card), a communications port, a PCMCIA slot and card, etc. Software and data transferred via the communications interface 624 may be in the form of signals, which may be electronic, electromagnetic, optical, or other signals as will be apparent to persons having skill in the relevant art. The signals may travel via a communications path 626, which may be configured to carry the signals and may be implemented using wire, cable, fiber optics, a phone line, a cellular phone link, a radio frequency link, etc.

The computer system 600 may further include a display interface 602. The display interface 602 may be configured to allow data to be transferred between the computer system 600 and external display 630. Exemplary display interfaces 602 may include high-definition multimedia interface (HDMI), digital visual interface (DVI), video graphics array (VGA), etc. The display 630 may be any suitable type of display for displaying data transmitted via the display interface 602 of the computer system 600, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 608 and secondary memory 610, which may be memory semiconductors (e.g., DRAMs, etc.). These computer program products may be means for providing software to the computer system 600. Computer programs (e.g., computer control logic) may be stored in the main memory 608 and/or the secondary memory 610. Computer programs may also be received via the communications interface 624. Such computer programs, when executed, may enable computer system 600 to implement the present methods as discussed herein. In particular, the computer programs, when executed, may enable processor device 604 to implement the methods illustrated by FIGS. 4 and 5, as discussed herein. Accordingly, such computer programs may represent controllers of the computer system 600. Where the present disclosure is implemented using software, the software may be stored in a computer program product and loaded into the computer system 600 using the removable storage drive 614, interface 620, and hard disk drive 612, or communications interface 624.

Techniques consistent with the present disclosure provide, among other features, systems and methods for processing payment transactions using a hybrid payment card. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for accessing a transportation system using a hybrid payment card, comprising:
   storing, in an account database of a processing server, an account profile, wherein the account profile includes data related to a hybrid payment card configured for use in at least two payment networks, the account profile including at least an account identifier, a prepaid balance, and a credit allowance, wherein the credit allowance is a daily credit amount;
   receiving, by a receiving device of the processing server, via a first payment network, a validation request, wherein the validation request includes at least the account identifier and a transaction amount, wherein the first payment network is a closed payment network associated with the transportation system;
   processing, by a processing device of the processing server, the received validation request, wherein processing the received validation request includes:
      generating a positive validation response and generating a validation transaction that indicates payment is to be made using the prepaid balance responsive to the prepaid balance included in the account profile being greater than or equal to the transaction amount,
      generating a positive validation response and generating a validation transaction that indicates payment is to be made using the credit allowance responsive to the prepaid balance included in the account profile being less than the transaction amount and responsive to the credit allowance included in the account profile being greater than or equal to the transaction amount, and
      responsive to the prepaid balance and the credit allowance included in the account profile being less than the transaction amount:
         requesting approval of a payment transaction by transmitting a payment authorization request, by a transmitting device of the processing server, via a second payment network, wherein the payment authorization request includes at least the account identifier and the transaction amount, wherein the second payment network is different from the first payment network,
         receiving, via the second network, an authorization response,
         generating a positive validation response and a validation transaction that indicates payment was made using the hybrid payment card responsive to the received authorization response indicating approval of the payment transaction, and
         generating a negative validation response responsive to the received authorization response indicating denial of the payment transaction; and
   transmitting, by the transmitting device to a point of sale turnstile device associated with the first network, one of a generated positive validation response and a generated negative validation response in response to the received validation request,
      wherein a transmitted generated positive validation response, causes a mechanical arm component of the point of sale turnstile device to operate to provide, to a user, access to the transportation system, and
      wherein a transmitted negative validation response, causes the point of sale turnstile device to deny, to the user, access to the transportation system; and
   resetting, by the processing device, the credit allowance included in the account profile to a default amount.

2. The method of claim 1, further comprising: transmitting, by the transmitting device, the generated validation transaction to the first payment network.

3. The method of claim 1, wherein the account profile is stored in a memory of the hybrid payment card, and the method further comprises:
   reading, by a reading device, at least the prepaid balance and credit allowance stored in the memory of the hybrid payment card.

4. The method of claim 3, further comprising:
   transmitting, by the transmitting device, the generated validation transaction to the hybrid payment card for use in updating the stored account profile.

5. The method of claim 1, further comprising: updating, by the processing device, the prepaid balance included in the account profile based on the transaction amount responsive to the prepaid balance included in the account profile being greater than or equal to the transaction amount; and
   updating, by the processing device, the credit allowance included in the account profile based on the transaction amount responsive to the prepaid balance included in the account profile being less than the transaction amount and responsive to the credit allowance included in the account profile being greater than or equal to the transaction amount.

6. The method of claim 1, wherein the hybrid payment card is configured for use in a credit and/or debit payment network and the closed payment network.

7. The method of claim 6, wherein the closed payment network is a public transportation network.

8. The method of claim 1, wherein generating the positive validation response and generating the validation transaction that indicates payment is to be made using the credit allowance responsive to the prepaid balance included in the account profile being less than the transaction amount and responsive to the credit allowance included in the account profile being greater than or equal to the transaction amount comprises:
   initializing processing of the received validation request with the prepaid balance; determining that the prepaid balance is less than the transaction amount; and processing the received validation request with the credit allowance instead of the prepaid balance.

9. A system for accessing a transportation system using a hybrid payment card, comprising:
- an account database of a processing server configured to store an account profile, wherein the account profile includes data related to a hybrid payment card configured for use in at least two payment networks, the account profile including at least an account identifier, a prepaid balance, and a credit allowance, wherein the credit allowance is a daily credit amount;
- a receiving device of the processing server configured to receive, via a first payment network, a validation request, wherein the validation request includes at least the account identifier and a transaction amount, wherein the first payment network is a closed payment network associated with the transportation system; and
- a processing device of the processing server configured to process the received validation request, wherein processing the received validation request includes:
  - generating a positive validation response and generating a validation transaction that indicates payment is to be made using the prepaid balance responsive to the prepaid balance included in the account profile being greater than or equal to the transaction amount,
  - generating a positive validation response and generating a validation transaction that indicates payment is to be made using the credit allowance responsive to the prepaid balance included in the account profile being less than the transaction amount and responsive to the credit allowance included in the account profile being greater than or equal to the transaction amount, and
  - wherein responsive to the prepaid balance and the credit allowance included in the account profile being less than the transaction amount, the processing device is further configured to perform:
    - requesting approval of a payment transaction by transmitting a payment authorization request, by a transmitting device of the processing server, via a second payment network, wherein the payment authorization request includes at least the account identifier and the transaction amount, wherein the second payment network is different from the first payment network,
    - receiving, via the second network, an authorization response,
    - generating a positive validation response and a validation transaction that indicates payment was made using the hybrid payment card responsive to the received authorization response indicating approval of the payment transaction, and
    - generating a negative validation response responsive to the received authorization response indicating denial of the payment transaction,
  - wherein the transmitting device is further configured to transmit to a point of sale turnstile device associated with the first network, one of a generated positive validation response and a generated negative validation response in response to the received validation request,
  - wherein a transmitted generated positive validation response, causes a mechanical arm component of the point of sale turnstile device to operate to provide, to a user, access to the transportation system, and
  - wherein a transmitted negative validation response, causes the point of sale turnstile device to deny, to the user, access to the transportation system; and
  - wherein the processing device is further configured to reset the credit allowance included in the account profile to a default amount.

10. The system of claim 9, wherein the transmitting device is further configured to transmit the generated validation transaction to the first payment network.

11. The system of claim 9, further comprising:
- a reading device, wherein the account profile is stored in a memory of the hybrid payment card, and the reading device is configured to read at least the prepaid balance and credit allowance stored in the memory of the hybrid payment card.

12. The system of claim 11, wherein the transmitting device is further configured to transmit the generated validation transaction to the hybrid payment card for use in updating the stored account profile.

13. The system of claim 9, wherein the processing device is further configured to:
- update the prepaid balance included in the account profile based on the transaction amount responsive to the prepaid balance included in the account profile being greater than or equal to the transaction amount; and
- update the credit allowance included in the account profile based on the transaction amount responsive to the prepaid balance included in the account profile being less than the transaction amount and responsive to the credit allowance included in the account profile being greater than or equal to the transaction amount.

14. The system of claim 9, wherein the hybrid payment card is configured for use in a credit and/or debit payment network and the closed payment network.

15. The system of claim 14, wherein the closed payment network is a public transportation network.

16. The hybrid payment card related to the account profile stored in the account database of the system of claim 9.

17. The hybrid payment card of claim 16, wherein the hybrid payment card includes an integrated circuit chip that includes rulesets and standards for the generation of cryptograms and transaction messages suitable for conducting payment transactions on either and both of the at least two payment networks.

18. The system of claim 9, wherein generating the positive validation response and generating the validation transaction that indicates payment is to be made using the credit allowance responsive to the prepaid balance included in the account profile being less than the transaction amount and responsive to the credit allowance included in the account profile being greater than or equal to the transaction amount comprises:
- initializing processing of the received validation request with the prepaid balance; determining that the prepaid balance is less than the transaction amount; and processing the received validation request with the credit allowance instead of the prepaid balance.

* * * * *